(12) United States Patent
McKinnon

(10) Patent No.: US 7,344,316 B2
(45) Date of Patent: Mar. 18, 2008

(54) CONNECTOR

(75) Inventor: Gillian Anne McKinnon, Ulverston (GB)

(73) Assignee: Tronic Limited, Cumbria (GB)

( * ) Notice: Subject to any disclaimer, the term of this patent is extended or adjusted under 35 U.S.C. 154(b) by 0 days.

(21) Appl. No.: 11/272,360

(22) Filed: Nov. 10, 2005

(65) Prior Publication Data

US 2006/0128196 A1  Jun. 15, 2006

Related U.S. Application Data

(60) Provisional application No. 60/627,730, filed on Nov. 12, 2004.

(30) Foreign Application Priority Data

Nov. 10, 2004 (GB) ................................. 0424864.7

(51) Int. Cl.
*G02B 6/38* (2006.01)
(52) U.S. Cl. .......................................... 385/56; 385/59
(58) Field of Classification Search .................. 385/56, 385/59, 83
See application file for complete search history.

(56) References Cited

U.S. PATENT DOCUMENTS

| 4,174,875 | A | 11/1979 | Wilson et al. ............. 339/91 P |
|---|---|---|---|
| 4,696,540 | A * | 9/1987 | Adams et al. ................ 385/66 |
| 4,756,595 | A | 7/1988 | Braun et al. ............. 350/96.21 |
| 4,759,601 | A | 7/1988 | Knutsen et al. .......... 350/96.21 |
| 4,887,883 | A * | 12/1989 | Darbut et al. ................. 385/58 |
| 5,125,056 | A * | 6/1992 | Hughes et al. ................ 385/59 |
| 5,590,229 | A * | 12/1996 | Goldman et al. ............. 385/59 |
| 6,315,461 | B1 * | 11/2001 | Cairns ......................... 385/56 |
| 6,929,404 | B2 * | 8/2005 | Jones et al. .................. 385/56 |
| 2002/0003931 | A1 * | 1/2002 | Cairns et al. ................. 385/56 |

FOREIGN PATENT DOCUMENTS

| EP | 0 538 089 A1 | 4/1993 |
|---|---|---|
| WO | WO 02/39169 A1 | 5/2002 |
| WO | WO 2005/022691 A2 | 3/2005 |

OTHER PUBLICATIONS

European Search Report, dated Jun. 6, 2006.

* cited by examiner

*Primary Examiner*—Chau N. Nguyen
(74) *Attorney, Agent, or Firm*—Alix, Yale & Ristas, LLP

(57) ABSTRACT

A connector for making an optical and/or electrical connection underwater or in a wet or severe environment, comprising first and second connector parts which are axially interengageable to establish the optical or electrical connection, the first connector part having relatively movable portions for relative movement to allow the optical or electrical connection to be established when the first and second connector parts are interengaged, and having latching means to prevent such relative movement. The latching means is preferably releasable by engagement with the second connector part.

18 Claims, 10 Drawing Sheets

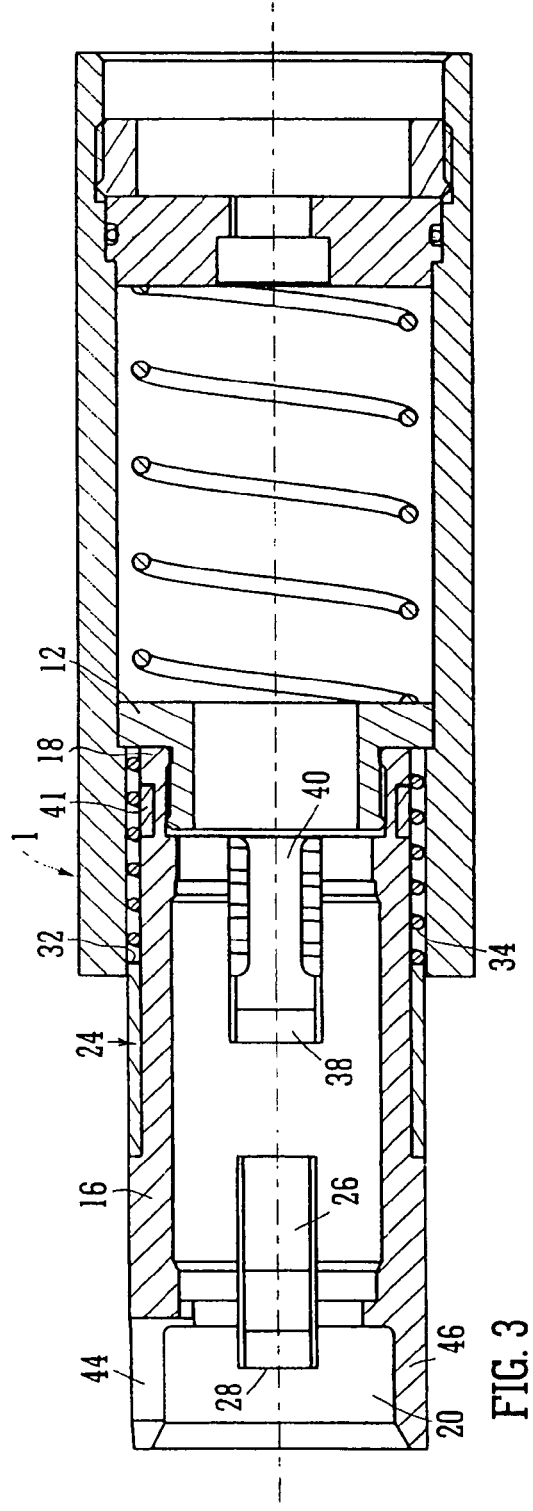

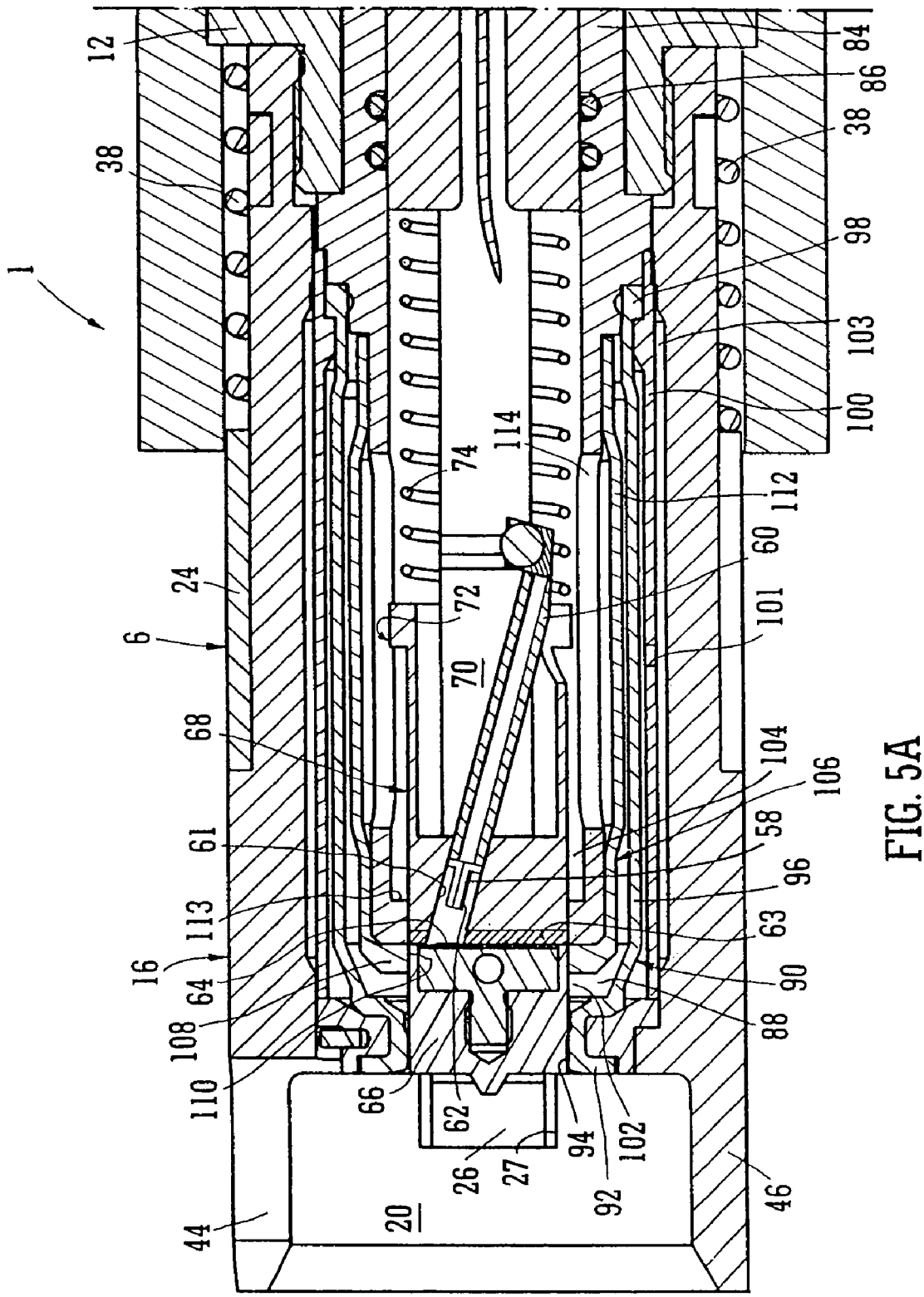

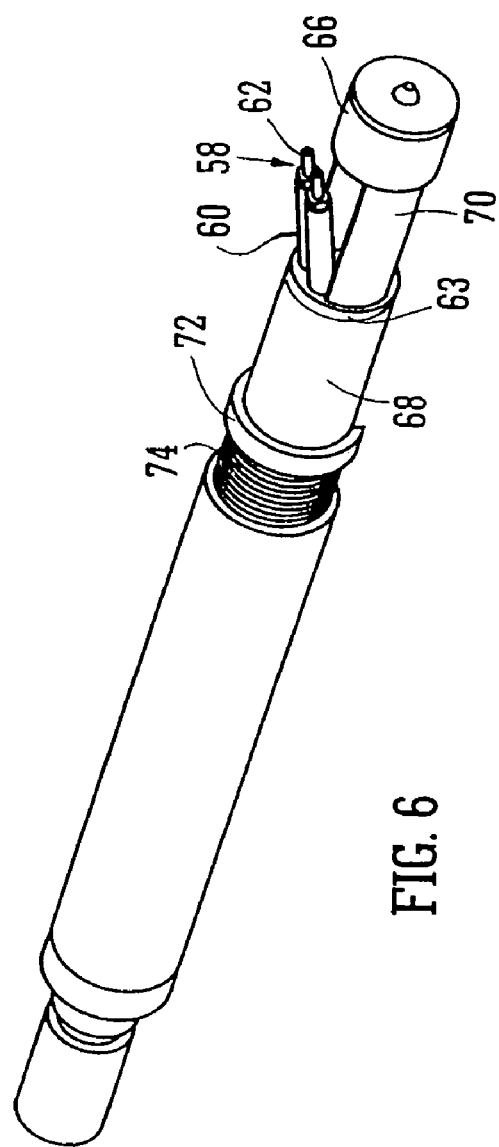
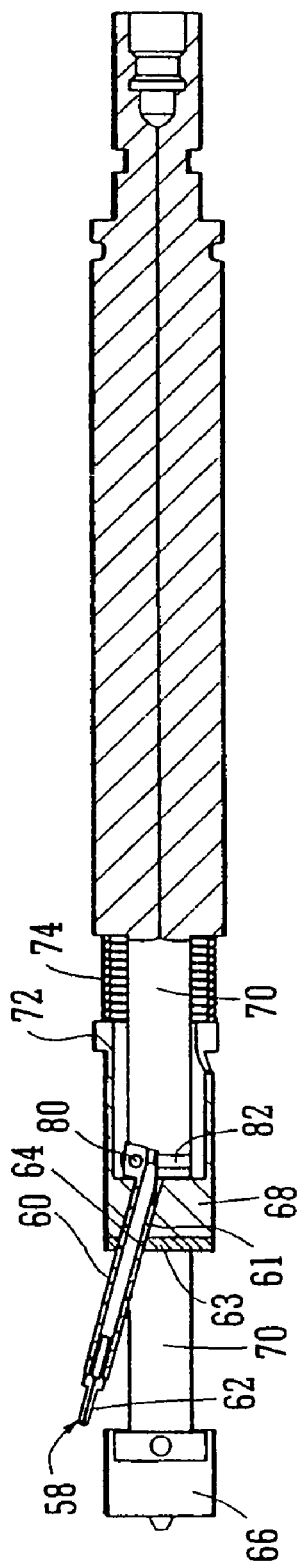
FIG. 6
FIG. 7

CONNECTOR

CROSS-REFERENCE TO RELATED APPLICATION

This application claims the priority of U.S. Provisional Patent Application No. 60/627,730 filed Nov. 12, 2004.

BACKGROUND OF THE INVENTION

This invention relates to a connector for making an optical and/or electrical connection underwater or in a wet or severe environment.

Optical fibres are frequently used for communication purposes, and it is often necessary to form an optical connection between the ends of such fibres. This generally involves bringing together two connector components each supporting a respective fibre and making end-to-end contact between the fibres. In the case of underwater connectors, it is known to provide the connector components with end sealing arrangements so that the optical fibre ends are protected from the outside environment when the components are in a disconnected state, the end sealing arrangements opening up during connection to allow passage of one of the optical fibre ends therethrough in order to establish the optical connection.

It is known from WO 02/39169 (the contents of which are hereby incorporated by reference) to provide an underwater optical connector, in which a first connector part has a probe and a second connector part has a chamber containing optical quality oil and closed by a spring biased shuttle piston. The probe of the first connector part is also housed in a chamber containing optical quality oil, this chamber being provided in a forwardly spring biased shuttle. When the connector parts are mated, the shuttle is pushed rearwardly by the front of a plug of the second connector part, so that the probe emerges from the sealed environment of the shuttle and passes into the sealed environment of the second connector part. In doing so, the probe pushes back the shuttle piston of the second connector part. Once the probe is in the oil filled chamber of the second connector part, and with continued interengagement of the connector parts, a front nose portion of the probe advances forwardly but a sleeve of the probe is prevented from further advancement. This allows an optical member to emerge laterally from the probe and establish an optical connection with an optical member in the second connector part.

In this known system, the shuttle of the first connector part is slidably carried in a housing. When the connector is in the disconnected state, the shuttle is recessed in the housing, which has a shield portion projecting forwardly of the shuttle. The shield portion then serves to protect the shuttle from being accidentally moved rearwardly and compromising its sealed integrity against the outside environment. However, this arrangement also means that the forwardly projecting shield portion of the housing has to receive axially the plug of the second connector part before the plug front face engages the shuttle front face and advancement of the probe into the second connector part can begin. In the fully mated condition, by the time the shuttle and plug internal components have connected to establish an optical connection, the front edge of the shield portion is a considerable axial distance from the front of the plug. This "overlap" of the shield portion and the plug is comprised of the axial length of the shield portion into which the plug engages initially in order to make face-to-face contact with the shuttle, plus a further length as the plug fully engages the housing of the first connector part to establish the optical connection. However, in some circumstances, there is a constraint on the amount of overlap which can be accommodated.

Similar arrangements, in which a shuttle is recessed in a housing which projects forwardly of the shuttle, are known from WO 86/02173 and WO 99/31540.

SUMMARY OF THE INVENTION

According to a first aspect of the invention, there is provided a connector for making an optical connection underwater or in a wet or severe environment, comprising first and second connector parts which are axially interengageable to establish the optical connection, the first connector part having relatively movable portions for relative movement to allow the optical connection to be established when the first and second connector parts are interengaged, and having releasable latching means to prevent such relative movement.

The latching arrangement means that the relatively movable portions of the first connector part can be latched together when the connector parts are not interengaged, thereby minimizing the risk of accidental movement which might compromise the integrity of the first connector part. Such accidental operation can be avoided without the use of a forwardly projecting shield, for example.

The optical connector may be particularly useful in the context of establishing optical communication to a tubing hanger of a well head assembly. For example, in the case of making a connection horizontally into a tubing hanger with one connector part supported horizontally in the tubing hanger wall, the amount of space available for the connector parts to overlap axially is limited by the radial thickness of the tubing hanger wall. The connector of the present invention may be used with the second connector part in the tubing hanger wall, and with the first connector part radially outwardly of the tubing hanger wall when disconnected. The movable portion of the first connector part, which has to move to allow the optical connection to be established, can be positioned to form the frontmost portion of the connector part, and if it is latched it will not be accidentally actuated due to its exposed position. The overall axial overlap of the connector parts when mated can be reduced as compared to the connector of WO 02/39169 without a risk of compromising sealing integrity.

The invention therefore also provides a well head assembly comprising a radially inner member having a fiber optic extending therein, a radially outer member, and a connector as disclosed herein, wherein the connector serves to establish optical communication with the fiber optic. The radially inner member may for example be a tubing hanger whilst the radially outer member may be a spool body.

Preferably the first connector part is supported in the radially outer member and the second connector part is supported in the radially inner member.

The optical connector of the present invention may be useful in other situations where the amount of space available for at least one of the connector parts is limited. It may for example be useful in a well head assembly where the connector makes a vertical connection into a tubing hanger, because a relatively short axial overlap of the connector parts in the tubing hanger upper wall when mated will help to create space for components below the connector.

In preferred arrangements, the optical connection is established in an environment protected by fluid media, such as gel or oil or the like.

The relatively movable portions of the first connector part may be laterally or rotationally relatively movable, but are preferably axially relatively movable. The relatively movable portions may comprise a shuttle and a support therefor (e.g. a housing), the shuttle being rearwardly movable relative to the support to establish the optical connection. Thus, the shuttle may be latched to the support when the first connector part is not engaged with the second connector part, so that it will not be accidentally rearwardly moved to compromise the integrity of components protected in its interior. At the point when the latching means is released, the shuttle becomes rearwardly movable.

In preferred arrangements, the shuttle contains a first optical member for connection with a second optical member contained in the second connector part. The arrangement may be such that during interengagement of the first and second connector parts the first optical member emerges from the shuttle to establish the optical connection with the second optical member. It will be appreciated that by latching the shuttle to its support it cannot be prematurely moved to allow the first optical member to emerge therefrom.

It will generally be desirable for the first and second connector parts to properly align during engagement. Preferably therefore the first and second connector parts have respective alignment portions at their front ends. In preferred arrangements, one of the connector parts, e.g. the first connector part, has a receptacle for receiving a front portion of the other connector part, e.g. the second connector part. There may be provided respect alignment components comprising an axial alignment key on one connector part and an axial alignment slot on the other connector part. The key or slot may be provided on the inside wall of the receptacle, with the other alignment component being provided on the outside wall of the front portion of the connector part to be received therein.

In the preferred embodiments, the shuttle of the first connector part provides the receptacle in which the front portion of the second connector part is received during connection. Thus, the receptacle is part of the shuttle.

The latching means is preferably arranged to release the relatively movable portions of the first connector part by lateral movement of the latching means. So, in the case of a shuttle relatively rearwardly movable on a support to establish the optical connection, the latching means may extend laterally between the shuttle and the support to latch them together. The lateral movement of the latching means to release the relatively movable portions is preferably radially inward movement. In the embodiments having a shuttle rearwardly movable relative to a support, the support may comprise a housing disposed radially outwardly of the shuttle. The housing may accommodate only a rear portion of the shuttle in the disconnected state of the connector, whereby the shuttle projects forwardly of the housing. The rear portion may be relatively short, for example less than half the overall length of the shuttle.

Latching may be effected by abutment of respective axially facing surfaces. The latching means may for example have a rearwardly facing surface abutting against a forwardly facing surface. In a preferred arrangement, the latching means is provided on the shuttle and has a rearwardly facing surface which engages with a forwardly facing surface of the support e.g. housing.

The latching means may be releasable by an actuator or the like which may be operated externally of the connector or remotely. Thus release can be effected at the point when the connector parts are to be interengaged. Preferably, the latching means is releasable by engagement with the second connector part. Thus release can be effected automatically during the interengagement process. The arrangement is preferably such that the second connector part urges the latching means axially in order to effect release of the relatively movable portions.

The latching means may have a latch release portion and a latching portion which co-operate to effect release of the relatively movable portions of the first connector part. Thus, the latch release portion may act on the latching portion to cause it to release the relatively movable portions. The latch release portion may be urged axially rearwardly, preferably by the second connector part, to cause the latching portion to effect release. This may be achieved for example by at least one of the latch release portion and the latching portion having a surface slanted relative to the axial direction. In this type of arrangement, axial movement can be used to effect lateral movement and hence release of the latching portion. In a preferred embodiment, the latching portion has a slanted surface. The latch release portion may have a front facing surface for engagement by the second connector part and, rearwardly thereof, a part which co-operates with the latching portion. The latch release portion is preferably resiliently forwardly biased. When it is urged rearwardly against the resilient bias it can effect release of the latching portion.

In the embodiment where the shuttle has a receptacle for receiving a front portion of the second connector part, the front portion is preferably arranged to engage the latching means during entry of the front portion into the receptacle, so as to release the latching means. The part of the latching means which is engaged by the front portion of the second connector part is preferably arranged towards the rear of the receptacle. In the preferred arrangement in which the latching means has a latch release portion and a latching portion, the latch release portion preferably extends into the receptacle so as to be engageable by the second connector part, for example to be urged axially rearwardly to cause the latching portion to release the relatively movable parts.

According to a second aspect of the invention, there is provided a connector for making an optical connection underwater or in a wet or severe environment, comprising first and second connector parts which are axially interengageable to establish the optical connection, the first connector part having a housing and a probe, the probe extending in a shuttle, and the shuttle being axially rearwardly movable relative to the housing and the probe, and the second connector part having a chamber containing fluid media for receiving the probe during interengagement of the connector parts, wherein during such interengagement the second connector part engages the shuttle and the probe advances forwardly relative to the shuttle and into the chamber of the second connector part to establish the optical connection, and wherein in the disconnected state of the connector the shuttle projects forwardly of the housing.

The extent to which the housing overlaps axially with the second connector part when the connector parts are interengaged is reduced (or eliminated) as compared to the known connectors where the shuttle is recessed in a housing which projects forwardly of the shuttle. The connector is therefore advantageous in situations where there is a limited amount of space available for axial overlap.

The shuttle preferably projects forwardly of the housing in the interengaged state of the connector. Thus, when the shuttle has moved rearwardly relative to the housing, it still projects forwardly therefrom. In such embodiments, because the housing has no axial overlap with the second connector part when the connector parts are interengaged, there is no need for any space to be provided around the second connector part to receive the housing.

In preferred embodiments, the shuttle has an alignment portion at its front end and the second connector part has an alignment portion at its front end, whereby during interengagement of the connector parts the respective alignment portions engage with each other and overlap axially. Alignment can thus be assisted by the shuttle, rather than by the housing of the shuttle.

As discussed above, the connector may be used as part of a well head assembly in which the first connector part is supported in a radially outer member e.g. a spool body and the second connector part is supported in a radially inner member e.g. a tubing hanger. The connector according to the second aspect of the invention is particularly useful in the context of such assemblies, where the available space in the radially inner member is limited.

In the embodiments where the shuttle and the second connector part have respective alignment portions at their front ends, it is preferred that when the connector parts are interengaged the alignment portion of the shuttle extends into the radially inner member to engage with the alignment portion of the second connector part.

Although latching of the shuttle relative to its housing in the case of the connector of the second aspect of the invention is preferred, it may not be necessary if for example the shuttle is biased to a forward position by a relatively stiff spring.

It will be appreciated that the various preferred features of the connector of the first aspect of the invention may also be preferred for the connector of the second aspect of the invention.

The optical connector of both aspects of the invention may be used purely to establish one or more optical connections, or it may also include electrical contacts for establishing one or more electrical connections. The optical and/or electrical contacts of the respective connector parts are preferably arranged to make their connections in an environment protected by fluid media such as gel or oil or the like.

The invention also extends to connectors for making an electrical connection underwater or in a wet or severe environment, i.e. without there being an optical connection.

Thus in a third aspect of the invention, there is provided a connector for making an electrical connection underwater or in a wet or severe environment, comprising first and second connector parts which are axially interengageable to establish the electrical connection, the first connector part having relatively movable portions for relative movement to allow the electrical connection to be established when the first and second connector parts are interengaged, and having releasable latching means to prevent such relative movement.

In a fourth aspect of the invention, there is provided a connector for making an electrical connection underwater or in a wet or severe environment, comprising first and second connector parts which are axially interengageable to establish the electrical connection, the first connector part having a housing and a probe, the probe extending in a shuttle and the shuttle being axially rearwardly movable relative to the housing and the probe, and the second connector part having a chamber containing fluid media for receiving the probe during interengagement of the connector parts, wherein during such interengagement the second connector part engages the shuttle and the probe advances forwardly relative to the shuttle and into the chamber of the second connector part to establish the electrical connection, and wherein in the disconnected state of the connector the shuttle projects forwardly of the housing.

The various preferred features of the first and second aspects discussed herein are applicable to the electrical connector of the third and fourth aspects, with references to establishing an optical connection being understood as references to establishing an electrical connection where appropriate. In preferred embodiments the probe of the first connector part comprises an electrical contact pin and a corresponding electrical contact socket is provided on the second connector part.

BRIEF DESCRIPTION OF THE DRAWING

A preferred embodiment of the invention will now be described by way of example and with reference to the accompanying drawings, in which:

FIG. 3 is a longitudinal sectional view on the lines III—III in FIG. 2;

FIG. 4 is a longitudinal sectional view on the lines IV—IV in FIG. 2;

FIG. 6 is a perspective view of an optical pin contact showing its condition when the connector is fully mated;

FIG. 7 is a longitudinal sectional view of the optical pin contact of FIG. 6;

DETAILED DESCRIPTION OF THE PREFERRED EMBODIMENTS

Figure 8:
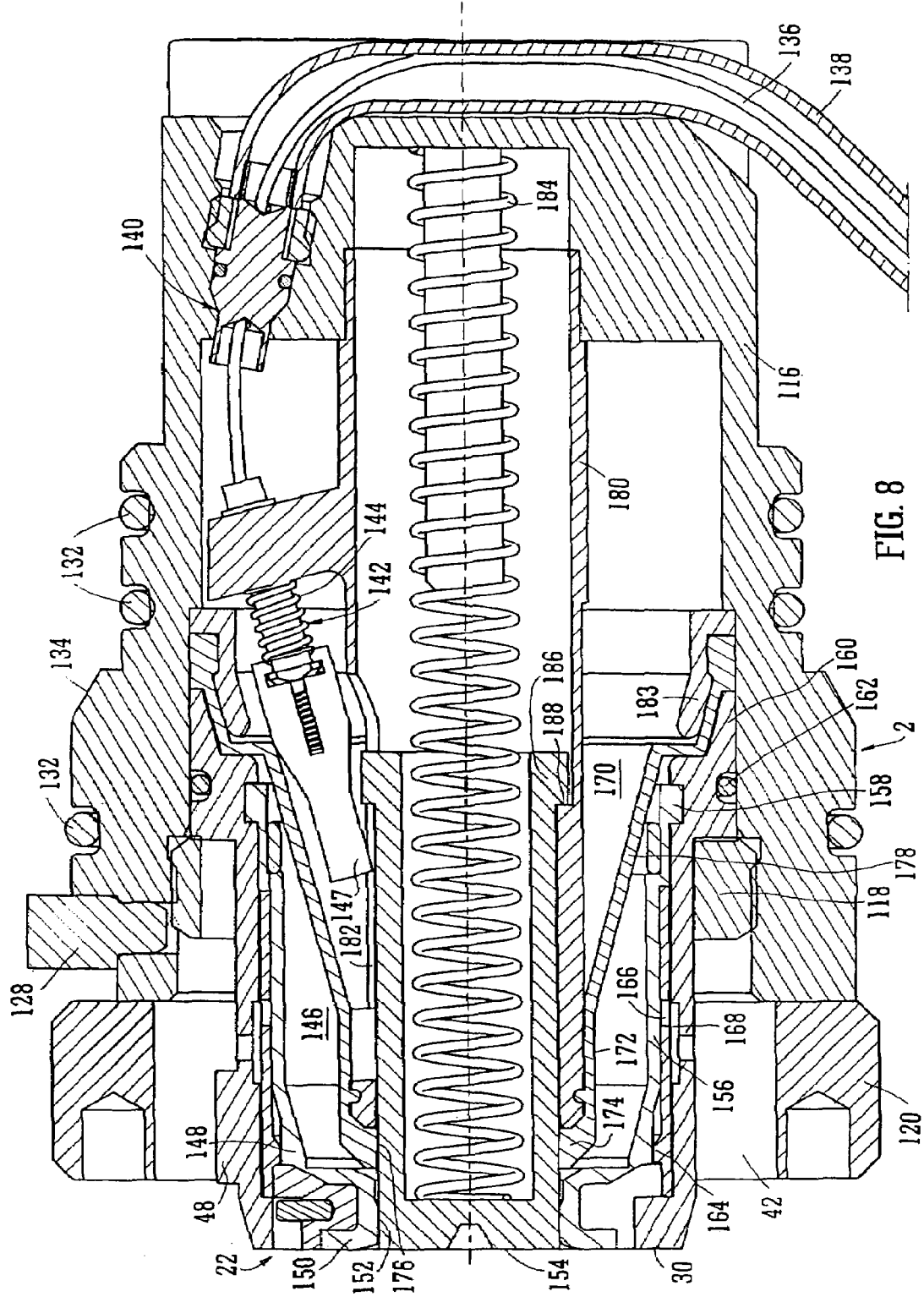
FIG. 8 is a longitudinal sectional view of a second connector part showing its internal components.

FIGS. 1 to 5 show a first connector part 1 and FIG. 8 shows a second connector part 2. The first connector part 1 has a housing 4 in which a shuttle 6 is axially movably located, biased to a forward position by a shuttle spring 8. The shuttle spring is seated against a rear wall 10 of the housing 4 and at its front it engages a collar 12 which abuts against a shoulder 14 of the housing.

The shuttle 6 has a cylindrical housing 16 which at its rear end 18 is fixed to the collar 12 and which has at its front end a forwardly projecting annular wall 46 forming a receptacle 20 for receiving a plug 22 of the second connector part 2 (see FIG. 8). The wall portion 46 has formed therein an axially extending alignment slot 44.

Latching means for latching the shuttle 6 to the housing 4 includes a latch release portion in the form of a latch release sleeve 24 and a latching portion in the form of a pair of latch arms 40. The latch release sleeve 24 is fitted around the cylindrical housing 16. The latch release sleeve 24 has a pair of diametrically opposed latch release arms 26, received in respective longitudinal slots 27 in the cylindrical housing 16. Each latch release arm has a front end portion provided with a forwardly facing surface 28 against which, during the mating procedure, a front face 30 of the plug 22 of the second connector part 2 engages (see FIG. 8). At its rear, the latch release sleeve 24 has an annular rear end face 32 engaged by a latch spring 34 which is seated against the collar 12 and biases the latch release sleeve 24 forwardly. The annular end face 32 is interrupted by a pair of diametrically opposed rectangular cutout regions 36 which receive respective wedge portions 38 provided at the front ends of the pair of latch arms 40. The wedge portions have rear faces 50 which engage a front face 52 of the housing 4 to latch the shuttle in its forward position. The wedge portions have forward faces 39 slanted with respect to the axial direction. The latch arms are arranged in diametrically opposed manner and are joined together at their rear ends by a ring portion 41.

As seen in FIG. 8, the plug 22 of the second connector part 2 has a forwardly opening annular space 42 around its front part. The plug 22 has a radially outwardly protruding and axially extending alignment key 48 for rotationally aligning with the corresponding slot 44 at the front of cylindrical housing 16 of the shuttle 6 of the first connector part 1.

The operation of the latching means will now be described. When the first connector part 1 is in the condition shown in FIGS. 1 to 4 the shuttle 6 is latched in position and cannot be moved rearwardly relative to the housing 4. When it is desired to mate the two connector parts, the plug 22 of the second connector part 2 moves into the receptacle 20 of the shuttle cylindrical housing 16. The annular wall 46 of the receptacle 20 is received in the corresponding annular recess 42 in the second connector part 2. The longitudinal forward facing alignment slot 44 formed in the annular wall 46 receives the alignment key 48 in the plug 22, ensuring that the two connector parts are rotationally aligned. The forward faces 28 of the latch release arms 26 are engaged by the front face 30 of the second connector part 2 and pushed rearwardly. The rear facing edges of the cutout portions 36 in the latch release sleeve 24 engage the slanted surfaces 39 of the wedge portions 38 of the latch release arms and, with rearward movement of the latch release sleeve 24, force the wedge portions radially inwardly until their rear faces 50 no longer engage the front face 52 of the housing 4. This allows the shuttle housing 16 to move rearwardly against the bias of shuttle spring 8 upon further engagement of the connector parts 1 and 2.

When the connector parts are to be disengaged, the shuttle cylindrical housing 16 returns to the position shown in FIGS. 1 to 4 under the effect of shuttle spring 8. As the plug 22 disengages from latch release arms 26 the latch release sleeve 24 returns to its forward position under the bias of latch spring 34 and thereby permits the wedge portions 38 of latch arms 40 to return to their radially outer positions under their own resilience. The rear faces 50 of the wedge portions 38 engage the front face 52 of housing 4 once again, thereby latching the shuttle 6 in its forward position.

Figure 1:
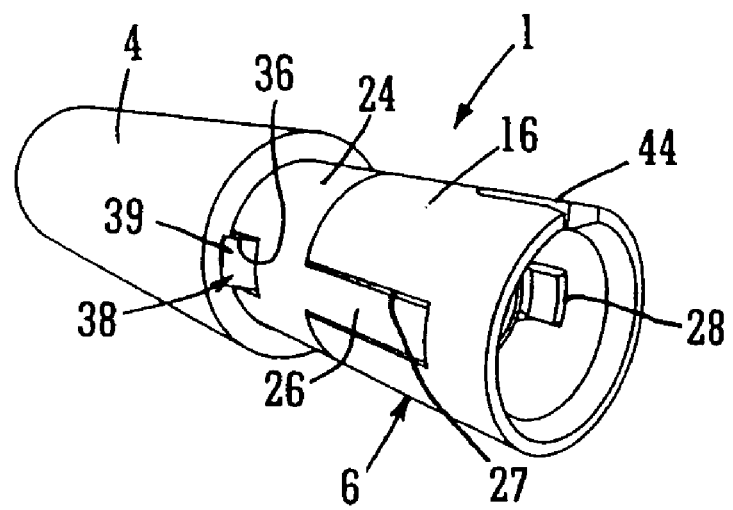
FIG. 1 is a perspective view of a first connector part.
Figure 2:
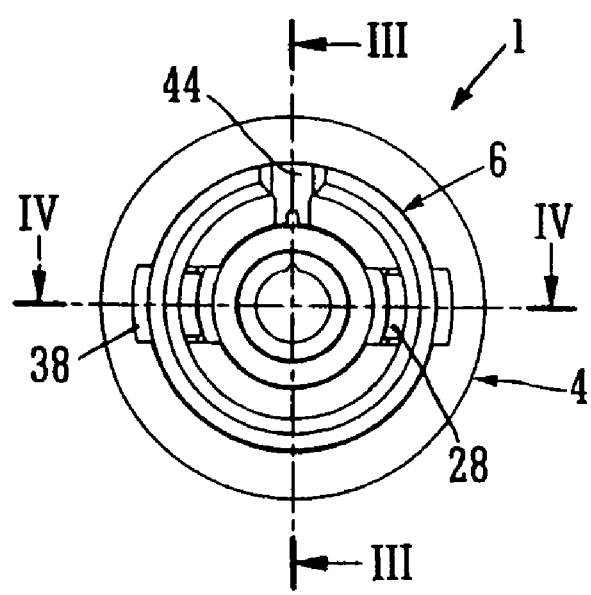
FIG. 2 is a front end view of the first connector part.
Figure 5B:
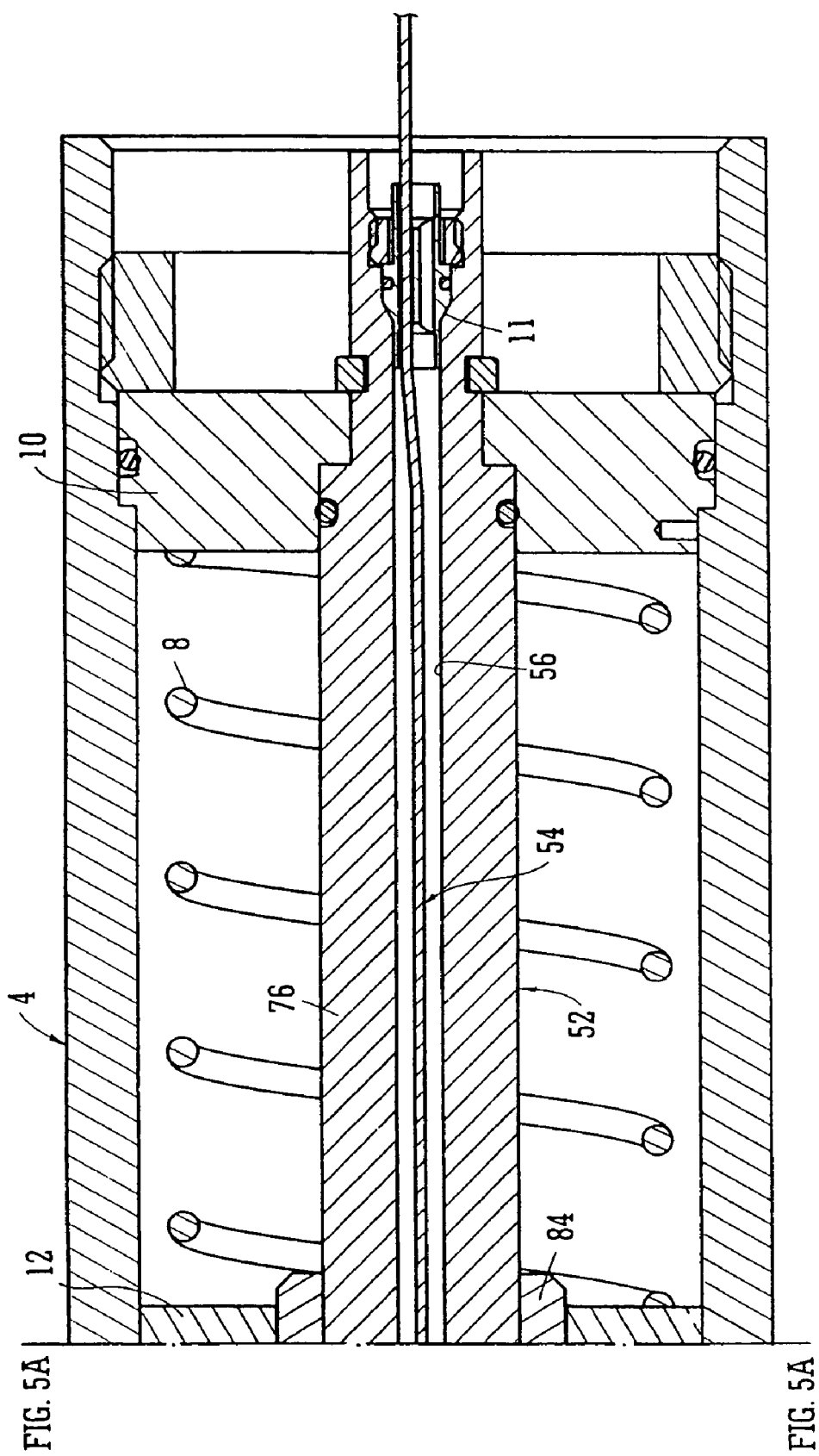
FIG. 5 (shown in two parts, as FIGS. 5A and 5B) is a longitudinal sectional view similar to that of FIG. 3 but to an enlarged scale and showing also the internal components of the first connector part.

FIGS. 5, 6 and 7 show the internal components of the first connector part 1. An axially arranged probe 52 projects rearwardly from the rear support 10. A pair of optical fibres 54 extend into the probe 52 via a sealed rear opening 11 and along a passage 56 in the probe to a pair of optical contacts 58 supported by a pair of rigid optical contact support tubes 60. The forward parts of the optical fibres are shown in FIGS. 6 and 7 in the position adopted when the connector parts are fully mated. At the front ends of the optical contacts 58, respective optical pins 62 are provided.

At its forward end the probe 52 has a nose portion 66. It will be possible in a modification for the rear part of this nose portion to have on its outer cylindrical surface one or more electrical contacts, which may be connected to one or more electrical conductors extending rearwardly of the probe to provide an electrical connection through to the rear of the first connector part. A suitable contact portion is shown as item 202 in WO 02/39169. However, in the embodiment shown and described, the connector is purely an optical connector and so it does not include electrical contacts.

To the rear of the nose portion 66 a sliding sleeve 68 is supported on a pair of axially extending arms 70, to the front end of which the probe nose portion 66 is secured. At its rear end the sliding sleeve 68 has a rear shoulder 72 which is engaged by the front end of a probe spring 74, the rear end of which is seated against a main body 76 of the probe 52. The nose portion 66, the support arms 70 and the main body 76 of the probe 52 are all fixed in position within the housing 4, with the sliding sleeve 68 being rearwardly slidable with respect thereto.

The front parts of the optical support contact tubes 60, in the unmated condition of the connector, engage a slanted passage 61 of the sliding sleeve 68. The optical contacts 58 are thus supported at an angle to the axial direction. A pair of front openings 64 are provided at the forward ends of the slanted passages 61, where a seal 63 is also provided. Each support tube 60 is provided with an outwardly directed lug 80 which engages in a respective transverse slot 82 formed in a respective support arm 70.

Thus, the optical contacts 58 including the optical pins 62 are contained within the periphery of the probe 52 when viewed in the axial direction, when the connector parts are disconnected. The optical pins 62 remain inside the slanted passage 61 in the disconnected state.

In the case of the modification having a nose portion 66 with one or more electrical contacts, the support arms 70 may be electrically conductive, or may support one or more electrical conductors, to provide the electrical connection through to the rear of the first connector part.

The arrangement provided by the shuttle 6 for sealing and protecting the probe 52 from the outside environment will now be described with reference to FIG. 5. The shuttle 6 has a rear sleeve 84 to which the probe 52 is slidably sealed by a pair of O-ring seals 86. Towards its front the rear sleeve 84 has a front lip 113. The outside of the rear sleeve 84 is secured to the collar 12 which is forwardly biased by spring 8 within the housing 4. The shuttle 6 defines a chamber 88 around the front of the probe 52: a probe chamber. The probe chamber 88 is defined within a primary diaphragm 90 filled with optical quality fluid media. The primary diaphragm 90 has a front wall 92 defining an opening 94 which is sealingly engaged by the nose portion 66 of the probe 52. The primary diaphragm has a generally cylindrical side wall 96 extending to a rear flange 98 captured between the outside of the shuttle rear sleeve 84 and a diaphragm retaining sleeve 100. The diaphragm retaining sleeve 100 is itself supported between the shuttle rear sleeve 84 and the shuttle cylindrical housing 16. The diaphragm retaining sleeve 100 is formed with radial ports 101, communicating with an annular space 103 between the outside of sleeve 100 and the inside wall of the shuttle cylindrical housing 16. The annular space 103 communicates with the outside via the longitudinal slots 27 in the housing 16 which accommodate the latch release arms 26. Thus, the outside of primary diaphragm 90 is effectively exposed to outside pressures and so allows volume changes within probe chamber 88 to equalise the pressure therein with external pressure. This minimises any tendency for outside water or other contaminants to enter the probe chamber 88.

The probe chamber 88 comprises an outer sub-chamber 102 and an inner sub-chamber 104, both filled with fluid media. The inner sub-chamber 104 is defined by a secondary diaphragm 106 which is seated on the outside of shuttle rear sleeve 84. The secondary diaphragm 106 has a front wall 108 formed with an opening 110 through which the probe nose portion 66 passes in slidable and sealing manner. The secondary diaphragm 106 has a generally cylindrical side wall 112 coaxial with the shuttle sleeve 84, the sleeve being formed with radial ports 114 to communicate the side wall 112 with the interior of the sub-chamber 104. The outside of secondary diaphragm side wall 112 is exposed to the pressure in the outer sub-chamber 102, thereby enabling inner sub-chamber 104 to equalise its pressure relative to outer sub-chamber 102. Outer sub-chamber 102 is able to equalise its pressure relative to the outside by exposure of primary diaphragm side wall 96 to outside pressure via the previously described radial ports.

The front opening 64 of optical fibre support tube 60 is located in the inner sub-chamber 104 when the connector parts are disconnected, as shown in FIG. 5.

The second connector part 2 will now be further described with reference to FIG. 8. The plug 22 is supported in a second connector outer housing 116 by a retaining ring 118 located generally axially centrally of the plug 22. To the rear of the retaining ring, the outside of the plug is sealed to the inside of the outer housing by an O-ring 162. The retaining ring 118 is formed with an external screw thread engaging with an internal screw thread formed on the housing 116. An outer retaining ring 120 extends round the front part of the plug 22, with the forwardly opening annular space 42 disposed radially outwardly of the plug and radially inwardly of the retaining ring 120. The outside of retaining ring 120 is provided with a screw thread for screwing to a corresponding internal thread formed in a bore 122 in a wall 124 of a tubing hanger 126 (see FIG. 9). The outer housing 116 is provided with an alignment key 128 projecting radially outwardly therefrom. The alignment key 128 aligns with an axial slot 130 in the bore 122 of the tubing hanger wall 124. The outside of the outer housing 116 is provided with three O-seals 132 for sealing the housing to the bore 122. A rearwardly facing conical face 134 is also provided on the outside of housing 116 to seal with a corresponding conical face 136 of the bore 122 when the retaining ring 120 is tightened.

A pair of optical fibres 136 extend upwardly along the tubing hanger wall in a protective tube 138. The protective tube joins a penetrator 140 at the rear of outer housing 116 where the optical fibres 136 pass into the housing. At the front ends of the optical fibres there is provided a pair of optical contacts 142 each arranged at an angle to the axial direction. The optical contacts each include a spring 144 allowing rearward resilient movement of an optical ferrule within a ferrule holder 147 at the front of the optical contact 142. This is a known optical contacting arrangement.

An outer chamber 146 containing fluid media is defined within a primary diaphragm 148 having a front wall 150 formed with an opening 152 in which a shuttle piston 154 is sealingly engaged. The primary diaphragm 148 has a circumferentially extending side wall 156 terminated at its rear with a flange 158 secured to the inside of a plug inner housing 160. The inner housing 160 is sealed by an O-ring 162 to the inside of the outer housing 116. The side wall 156 is surrounded by a retaining sleeve 164 formed with radial ports 166 and the inner housing 160 is formed with radial ports 168. The outside of the side wall 156 of the primary diaphragm is thus communicated with the outside via radial ports 166 and 168 and annular space 42. The communication of the outside of the primary diaphragm 148 with the outside environment allows the outer chamber 146 to change in volume in response to external pressure changes and displacements due to entry of the probe 52. The pressure in the chamber may therefore be equalised with external pressure so as to minimise any opportunity for external water or contaminants to enter the chamber.

An inner chamber 170 is defined axially inwardly of the outer chamber 146 and is also filled with fluid media. The inner chamber 170 is defined within a secondary diaphragm 172. The inner diaphragm has a front wall 174 formed with an opening 176 through which the shuttle piston 154 passes in sealing manner. The secondary diaphragm 172 has a circumferentially extending side wall 178, of generally conical shape in order to accommodate the pair of optical contacts 142. The outside of the side wall 178 is exposed to pressure in the outer chamber 146, thereby allowing pressure equalisation of the inner chamber 170 relative to the outer chamber 146. The secondary diaphragm 172 is supported at its front end on a sleeve 180 around the shuttle piston 154. The sleeve 180 is formed with a slot opening 182 allowing the optical contacts 142 to be positioned in close proximity to the shuttle piston 154 and, as will be described later, to allow the optical contact pins 62 to gain access to the optical contacts 142. At its rear the secondary diaphragm 172 is retained against the inner housing 160 and the outer housing 116 by a retaining ring 183.

The shuttle piston 154 is forwardly biased by a shuttle piston spring 184, so that in the unmated condition of the second connector part 2 shown in FIG. 8 the shuttle piston blocks and closes opening 152, which forms the entrance to the fluid filled outer chamber 146, and the opening 176, which forms the entrance to the fluid filled inner chamber 170 where the optical connections are to be established. The shuttle piston has at its rear a flange 186 which abuts against a shoulder 188 on the sleeve 180 to define its forward most position.

In the modification of the connector providing an electrical connection, an electrical contact socket may be provided on a radially inwardly facing surface of the sleeve 180, to receive an electrical contact provided on the nose portion 66 of the probe 52 when the shuttle piston 154 is pushed back. A suitable contact socket is shown as item 130 in WO 02/39169.

In a further modification in which the connector is an electrical connector only, probe 52 may be formed as an electrical contact pin for engagement in an electrical contact socket provided radially outwardly of shuttle piston 154, with no optical contacts being provided.

Figure 12:
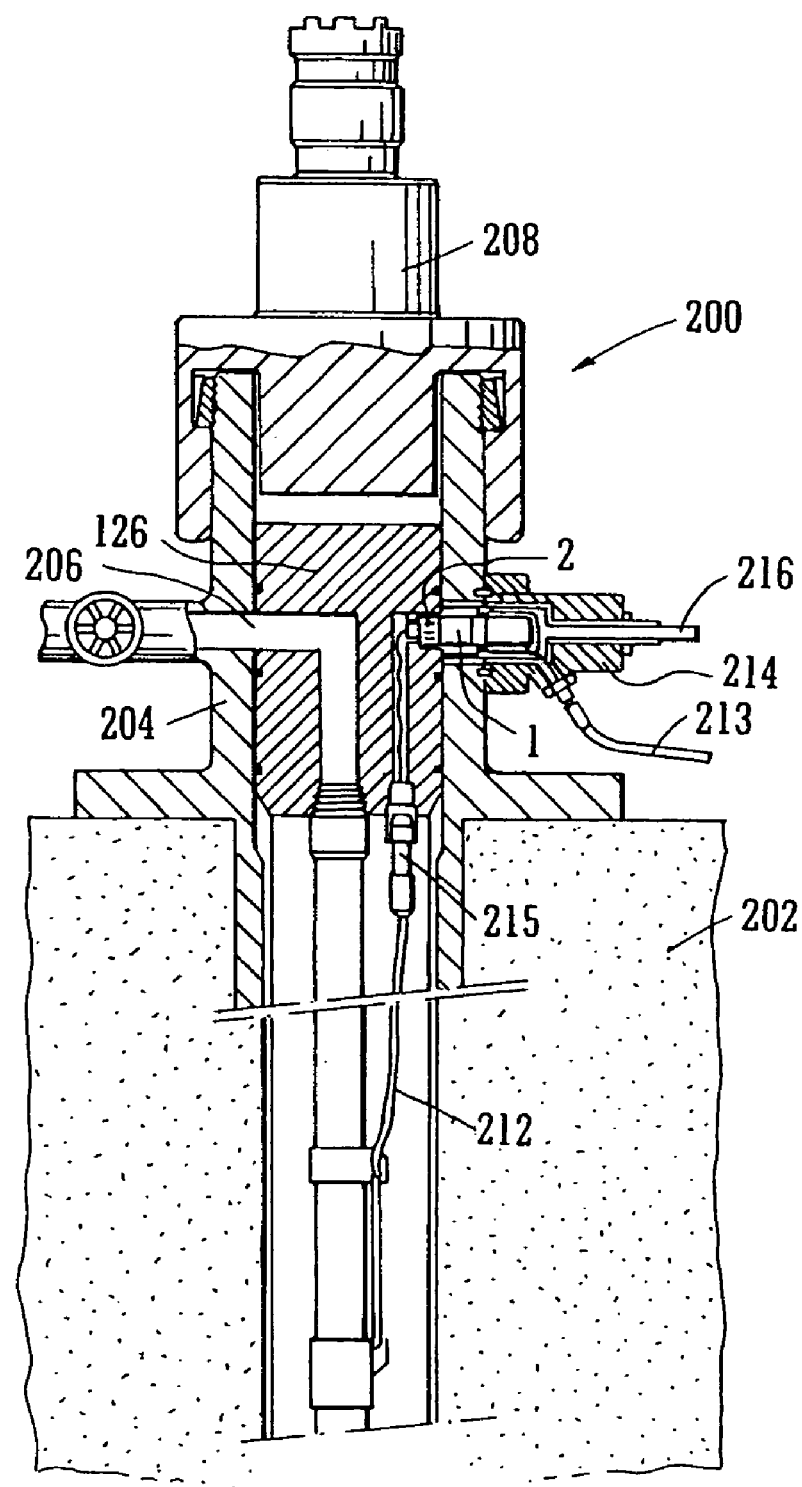
FIG. 12 shows a wellhead assembly in which the connector is installed.

FIG. 12 shows a well head assembly 200 of the "horizontal tree" type in which the connector is installed. The well head assembly rests on the sea-floor 202 and comprises a spool body 204 from which a production line 206 emerges horizontally. The horizontal tree is capped by a tree cap 208. Within the spool 204 body a tubing hanger 126 is supported. The downhole part of the oil production line is secured to the tubing hanger which serves to divert the production line from a vertical to a horizontal orientation. The tubing hanger 126 is connected via a dry mated connector 215 to a downhole instrument cable 212 which also passes from a vertical to a horizontal orientation inside the tubing hanger. The first connector part 1 for the instrument cable is supported in a horizontal bore th rough the spool body 204 and extends rearwardly therefrom into a bonnet assembly 214. The second connector part 2 is supported in the tubing hanger wall. At the rear of the bonnet assembly 214 an actuator mechanism 216 is provided in order to actuate the first connector part 1 forwardly to effect mating of the connector and rearwardly to de-mate the connector. At the side of the bonnet assembly 214 there is a connection to an underwater cable or hose 213.

Figure 9:
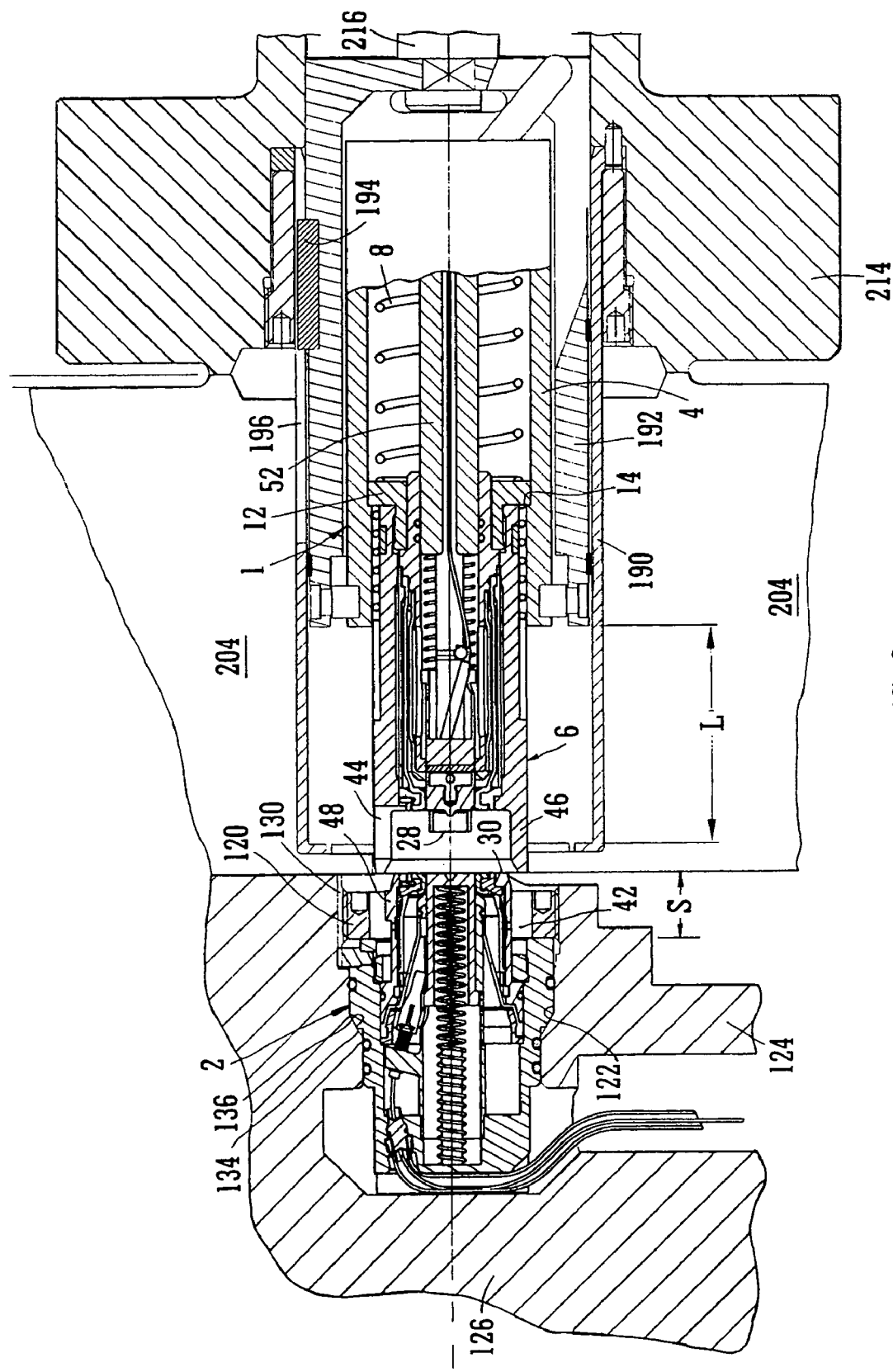
FIG. 9 is a longitudinal sectional view showing the first and second connector parts prior to mating.

Further details of the arrangement of the first and second connector parts on the horizontal tree well head assembly are shown in FIG. 9, with the connector parts de-mated. The first connector part 1 is supported in a casing 190 which is secured to the bonnet assembly 214 and projects forwardly therefrom into a horizontal bore in the spool body 204. An actuator sleeve 192 is secured to the housing 4 of the connector 1 and is provided with a guide key 194 engaged in a guide slot 196 of the casing 190 for axial forward and rearward movement effected by the actuator mechanism 216. The probe 52 of the first connector part is also fixed to move with the actuator mechanism 216, so that the actuator sleeve 192, the connector housing 4 and the probe 52 all move together with no relative axial movement.

The second connector part 2 is supported in the tubing hanger 126 in the manner previously described.

Figure 10:
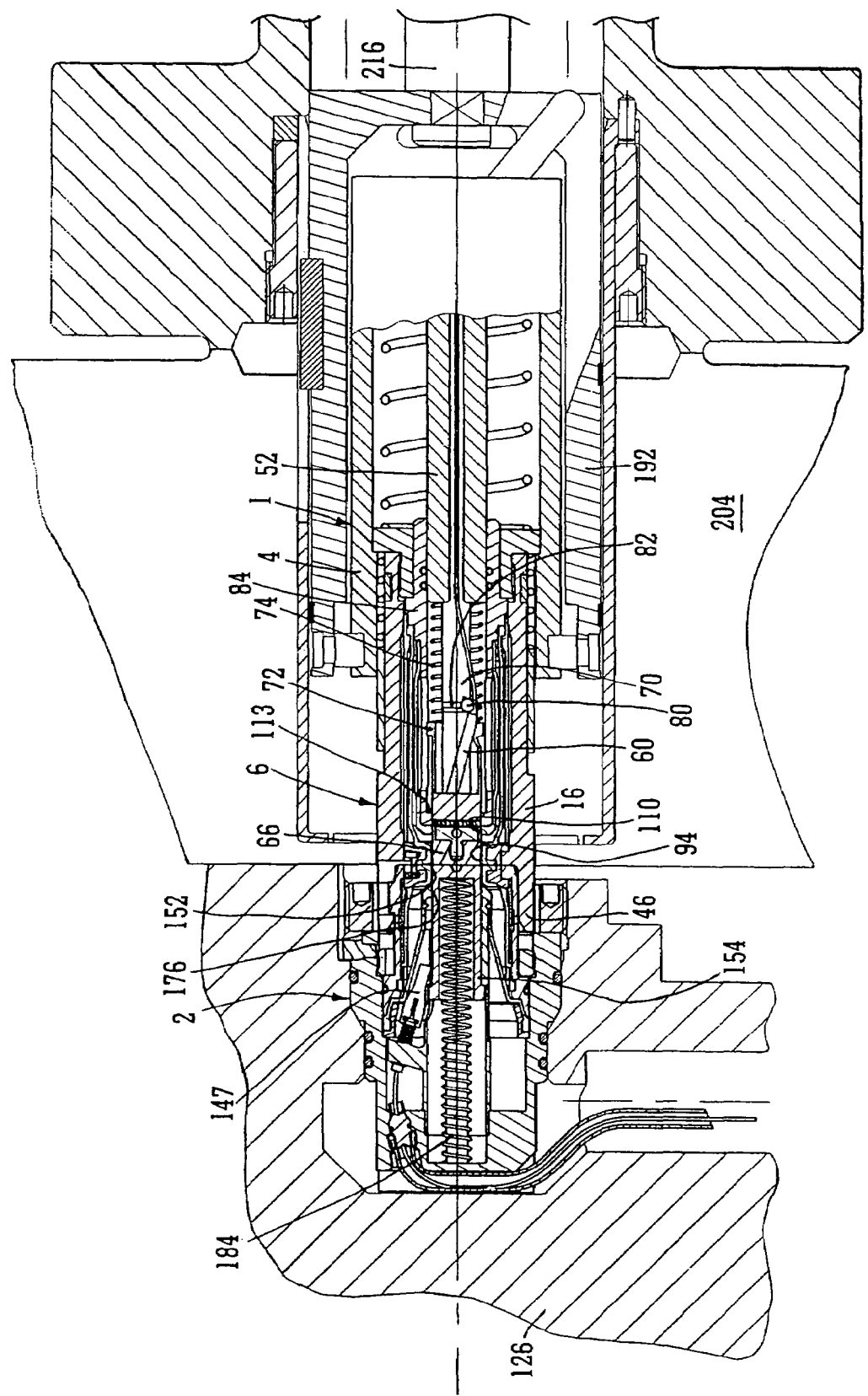
FIG. 10 shows a longitudinal sectional view of the first and second connector parts at an intermediate mating stage, when the latching means has been released.
Figure 11:
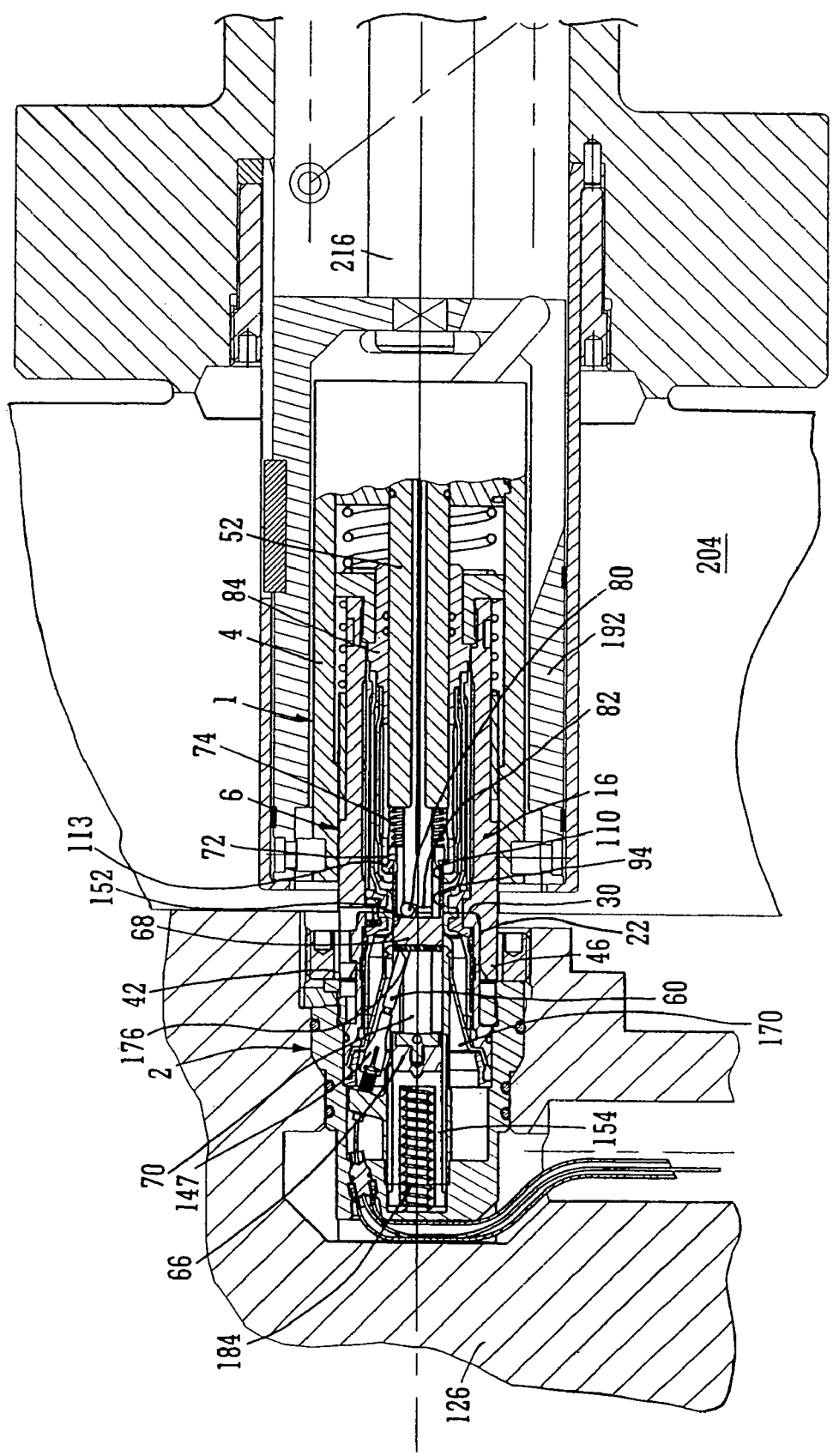
FIG. 11 shows the first and second connector parts when fully mated.

FIGS. 9, 10 and 11 respectively show the connector when de-mated, when the latch arms 40 have just been released, and when fully mated. The mating process will now be described.

In the de-mated condition shown in FIG. 9, the actuator sleeve 192, the connector housing 4 and the probe 52 are in a rearward position. The actuator mechanism 216 is operated to move these components forwardly, guided by the guide key 194 in the guide slot 196. The annular wall 46 of the shuttle cylindrical housing 16 engages in the annular space 42 of the second connector part 2, with the alignment key 48 of the second connector part engaging in the alignment slot 44 of the first connector part. During this movement the shuttle 6 moves with the connector housing 4 with no relative axial movement, by virtue of the engagement of the latch arms 40 with the housing 4.

FIG. 10 shows the stage when the annular wall 46 of the shuttle cylindrical housing 16 is fully advanced into annular space 42 of the second connector part 2. As described previously, during the last part of the movement of annular wall 46 into annular space 42, the front face 30 of the plug 22 engages the front surfaces 28 of the latch release arms 26 so as to urge the arms rearwardly and effect disengagement of the latch arms 40 from the connector housing 4. The shuttle 6 is then free to move axially rearwardly relative to the housing 4. At the stage shown in FIG. 10, when the latch arms 40 have just been released, the shuttle 6 is fully forward so that the nose portion 66 of the probe 52 continues to block the opening 94 in the primary diaphragm 90 of the first connector part 1 and also blocks the opening 10 in the secondary diaphragm 106. The shuttle piston 154 of the second connector part 2 is in its forward most position, closing the opening 152 in the primary diaphragm 150 and also the opening 176 in the secondary diaphragm 178. The front face of the nose portion 66 is engaged with the front face of the shuttle piston 154.

With continued advancement of the actuator mechanism 216, the probe 52 of the first connector part advances into the second connector part. The probe nose portion 66 pushes back the shuttle piston 154 and slidingly engages in the seal openings 152 and 176 to form respective seals therewith. At this point, the shoulder 72 of the sliding sleeve 68 of the probe 52 engages the front lip 113 of the shuttle rear sleeve 84 so that it can no longer move forwardly. The cylindrical front part of the sliding sleeve 68 therefore remains in the diaphragm openings 152 and 176 of the second connector part 2, to maintain the seals to the respective chambers 146 and 170 of that connector part, whilst the rear part of the sliding sleeve 68 rests in the diaphragm openings 94 and 10 of the first connector part 1 to maintain the seals of the respective chambers 102 and 104 in that connector part.

As the probe 52 continues to advance forwardly, its nose portion 66 separates from the retained sliding sleeve 68 and advances forwardly into the inner chamber 170 of the second connector part 2. During this process the spring 74 of the first connector part 1 compresses, as does the spring 184 of the second connector part 2 (as the shuttle piston 154 is pushed rearwardly). As the probe arms 70 advance forwardly, the optical contact support tubes 60 carried on those arms by lugs 80 sliding in grooves 82, are urged laterally in sliding engagement with slanted passages 61 in sliding sleeve 68. The optical contact support tubes 60 adopt the position shown in FIGS. 6 and 7, with the optical pins 62 projecting out of the probe at a slant to the axial direction. With further axial forward movement of the arms 70 the optical pins 62 engage in the ferrule holders 147 and thereby establish an optical connection.

The stroke length "L" through which the actuator sleeve 192, the connector housing 4 and the probe 52 move forwardly to establish the optical connection is shown in FIG. 9, which also shows the distance "S" by which the shuttle 6 advances. The axial "overlap" of the first and second connector parts 1 and 2 when fully mated corresponds to the distance "S", which is relatively short whilst enabling a reliable connection to be established.

To de-mate the connector, actuator mechanism 216 is operated to move the actuator sleeve 192, the connector housing 4 and the probe 52 rearwardly. The de-mating sequence is then the reverse of the mating sequence.

The invention claimed is:

1. A well head assembly comprising:
    a radially inner member having a fibre optic extending therein;
    a radially outer member; and
    a connector for making an optical connection with the inner member fiber optic, the connector including first and second connector parts which are axially interengageable to establish the optical connection;
        the first connector part being supported in the radially outer member and having
            relatively movably portions for relative movement to allow the optical connection to be established when the first and second connector parts are interengaged, and
            releasable latching means to prevent such relative movement; and
        the second connector part being supported in the radially inner member and having a front portion to be received by the receptacle of the first connector part;
            wherein the front portion is arranged to engage the latching means during entry of the front portion into the receptacle, whereby the latching means is released.

2. The well head assembly as claimed in claim 1, wherein the latching means is arranged to release the relatively moveable portions by lateral movement of the latching means.

3. The well head assembly as claimed in claim 2, wherein the lateral movement of the latching means is radially inward movement.

4. The well head assembly as claimed in claim 1, wherein the latching means is releasable by engagement with the second connector part.

5. The well head assembly as claimed in claim 4, wherein the second connector part urges the latching means axially in order to effect release of the relatively moveable portions.

6. The well head assembly as claimed in claim 1, wherein the latching means has a latch release portion and a latching portion which co-operate to effect release of the relatively movable portions of the first connector part.

7. The well head assembly as claimed in claim 6, wherein at least one of the latch release portion and the latching portion has a surface slanted relative to the axial direction.

8. The well head assembly as claimed in claim 6, wherein the latch release portion is resiliently forwardly biased.

9. The well head assembly as claimed in claim 1, wherein the relatively moveable portions of the first connector part are relatively axially moveable.

10. The well head assembly as claimed in claim 9, wherein the relatively moveable portions comprise a shuttle and a support therefor, the shuttle being rearwardly movable relative to the support to establish the optical connection.

11. The well head assembly as claimed in claim 10, wherein the shuttle contains a first optical member for connection with a second optical member contained in the second connector part, and wherein during interengagement of the first and second connector parts the first optical member emerges from the shuttle to establish the optical connection with the second optical member.

12. The well head assembly as claimed in claim 1 wherein the relatively moveable portions comprise a shuttle and a support therefor, the shuttle being rearwardly movable relative to the support to establish the optical connection, and wherein the receptacle is part of the shuttle.

13. The well head assembly as claimed in claim 1, wherein the optical connection is established in an environment protected by fluid media.

14. The well head assembly as claimed in claim 1, wherein the shuttle has an alignment portion as its front end and the second connector part has an alignment portion at its front end, whereby during interengagement of the connector parts the respective alignment portions engage with each other and overlap axially, and wherein when the connector parts are interengaged the alignment portion of the shuttle extends into the radially inner member to engage with the alignment portion of the second connector part.

15. A connector for making an optical connection underwater or in a wet or severe environment, comprising first and second connector parts which are axially interengageable to establish the optical connection,
the first connector part having
a housing,
a probe,
a shuttle, and
a releasable latch to latch the shuttle to the housing,
wherein the probe extends in the shuttle and the shuttle is axially rearwardly movable relative to the housing and the probe when the latch is released; and
the second connector part having a chamber containing fluid media for receiving the probe during interengagement of the connector parts;
wherein during such interengagement the second connector part engages the shuttle and the probe advances forwardly relative to the shuttle and into the chamber of the second connector part to establish the optical connection, and wherein in the disconnected state of the connector the shuttle projects forwardly of the housing and is latched to the housing by said releasable latch.

16. A connector as claimed in claim 15, wherein in the interengaged state of the connector the shuttle projects forwardly of the housing.

17. A connector as claimed in claim 15, wherein the shuttle has an alignment portion at its front end and the second connector part has an alignment portion at its front end, whereby during interengagement of the connector parts the respective alignment portions engage with each other and overlap axially.

18. A connector for making an optical connection underwater or in a wet or severe environment, comprising first and second connector parts which are axially interengageable to establish the optical connection;
the first connector part having:
a housing;
a probe; and
a shuttle having an alignment portion at its front end, the probe extending in the shuttle and the shuttle being axially rearwardly movable relative to the housing and the probe;
the second connector part having:
an alignment portion at its front end; and
a chamber containing fluid media for receiving the probe of the first connector part during interengagement of the connector parts;
wherein in the disconnected state of the connector the shuttle projects forwardly of the housing and wherein during interengagement of the connector parts the alignment portion of the second connector part and the alignment portion of the shuttle engage with each other and overlap axially to ensure that the two connector parts are rotationally aligned, and during such interengagement the probe advances forwardly relative to the shuffle and into the chamber of the second connector part to establish the optical connection.

* * * * *

UNITED STATES PATENT AND TRADEMARK OFFICE
CERTIFICATE OF CORRECTION

PATENT NO. : 7,344,316 B2  Page 1 of 1
APPLICATION NO. : 11/272360
DATED : March 18, 2008
INVENTOR(S) : McKinnon It is certified that error appears in the above-identified patent and that said Letters Patent is hereby corrected as shown below:

<u>Column 13</u>:

Line 30, after "claim 1" insert --,--.

<u>Column 14</u>:

Line 50, delete "shuffle" and substitute --shuttle--.

Signed and Sealed this

First Day of July, 2008

JON W. DUDAS
*Director of the United States Patent and Trademark Office*